United States Patent
Theobald

(10) Patent No.: US 9,506,479 B1
(45) Date of Patent: Nov. 29, 2016

(54) ACCUMULATOR METHOD AND APPARATUS

(71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 504 days.

(21) Appl. No.: 14/011,840

(22) Filed: Aug. 28, 2013

(51) Int. Cl.
*F15B 1/16* (2006.01)
*B25J 18/00* (2006.01)

(52) U.S. Cl.
CPC ............... *F15B 1/165* (2013.01); *B25J 18/00* (2013.01)

(58) Field of Classification Search
CPC .... B25J 18/00; F15B 1/165; Y10T 74/20305
See application file for complete search history.

(56) References Cited

U.S. PATENT DOCUMENTS

| | | | | |
|---|---|---|---|---|
| 4,300,198 A | * | 11/1981 | Davini | B05B 13/0431 318/568.14 |
| 4,688,983 A | * | 8/1987 | Lindbom | B25J 9/046 414/735 |
| 4,904,150 A | * | 2/1990 | Svensson | B25J 19/0012 188/382 |
| 4,959,958 A | * | 10/1990 | Nishikawa | B25J 9/0012 138/30 |
| 5,249,631 A | * | 10/1993 | Ferren | B08B 3/02 169/24 |
| 8,567,185 B1 | * | 10/2013 | Theobald | B25J 9/00 60/413 |
| 2004/0255711 A1 | * | 12/2004 | Takenaka | B25J 19/0008 74/490.01 |
| 2011/0072930 A1 | * | 3/2011 | Bayer | B25J 19/0012 74/490.01 |
| 2012/0186379 A1 | * | 7/2012 | Miyamoto | B25J 19/0012 74/490.01 |
| 2012/0186380 A1 | * | 7/2012 | Yamada | B25J 19/0012 74/490.01 |

* cited by examiner

*Primary Examiner* — David M Fenstermacher
(74) *Attorney, Agent, or Firm* — Albert J. Brunett

(57) ABSTRACT

An in-line hydraulic accumulator system has a substantially rigid elongated accumulator member that at least in part forms a longitudinal liquid channel having first and second liquid interfaces. The first liquid interface is longitudinally spaced from the second liquid interface to transport liquid therebetween. The accumulator system also has a compressible member that longitudinally extends within elongated member and at least in part forms the longitudinal liquid channel. The compressible member is configured to compress, expand, or both expand and compress in response to varying liquid pressures within the longitudinal liquid channel.

4 Claims, 3 Drawing Sheets

ACCUMULATOR METHOD AND APPARATUS

FIELD OF THE INVENTION

The present invention relates generally to managing pressures at least in a fluid line and, in at least one embodiment, to accumulators.

BACKGROUND OF THE INVENTION

Hydraulic fluid circuits are used in a wide variety of applications to deliver the force required to move physical objects. For example, robots often have hydraulic circuits to move their arms, which can grasp and move physical objects in their environment. Problems arise, however, when pressure within the hydraulic circuit unexpectedly and significantly deviates from the pre-set system pressure. Specifically, a pressure spike caused by some external condition can damage internal seals, walls, and connectors within the circuit. Moreover, the robot may have a sudden need for extra energy that cannot be provided by its local motors.

The art has responded to these problems by securing pressure regulating devices, known in the art as "accumulators," exterior of the member using the hydraulic circuit. Continuing with the robot example, this may involve securing an accumulator on some exterior portion of the robot—often in close proximity to the exterior of the robotic arm. This exterior mounting increases the profile/size of the robot, consequently limiting its mobility and usefulness, among other drawbacks.

SUMMARY OF THE INVENTION

In accordance with one embodiment of the invention, an in-line hydraulic accumulator system has a substantially rigid elongated accumulator member that at least in part forms a longitudinal liquid channel having first and second liquid interfaces. The first liquid interface is longitudinally spaced from the second liquid interface to transport liquid therebetween. The accumulator system also has a compressible member that longitudinally extends within elongated member and at least in part forms the longitudinal liquid channel. The compressible member is configured to compress, expand, or both expand and compress in response to varying liquid pressures within the longitudinal liquid channel.

BRIEF DESCRIPTION OF THE DRAWINGS

The following detailed description will be better understood when read in conjunction with the appended drawings in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Figure 1:
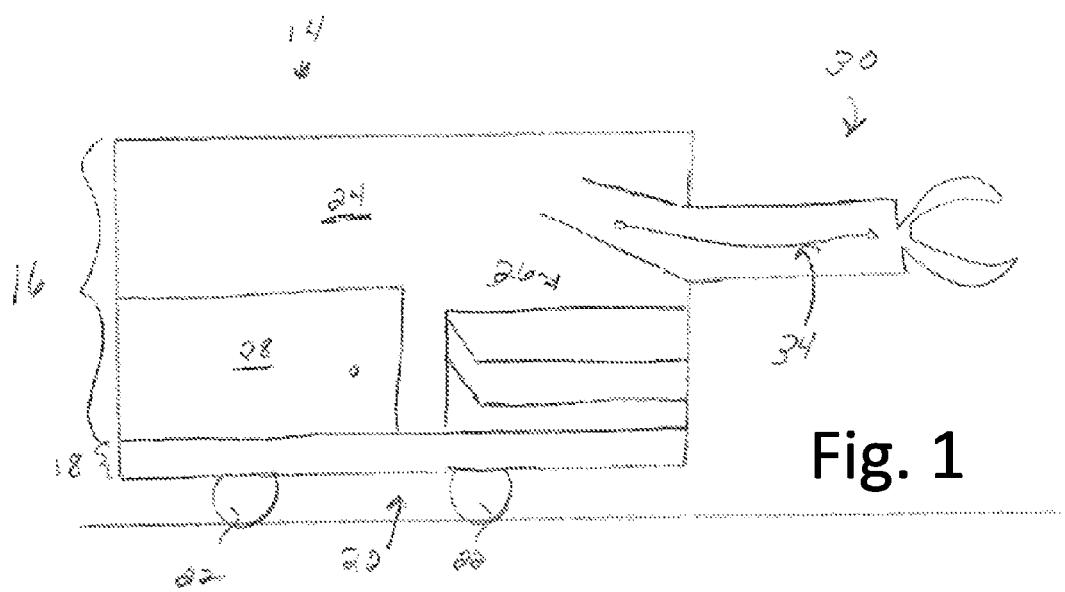
FIG. 1 is a schematic side view of a robot that may implement illustrative embodiments of the invention.

Various embodiments of the present invention are described below with reference to the accompanying drawings. It should be understood that the following description is intended to describe exemplary embodiments of the invention, and not to limit the invention.

It is understood that the present invention is not limited to the particular components, analysis techniques, etc. described herein, as these may vary. It is also to be understood that the terminology used herein is used for the purpose of describing particular embodiments only, and is not intended to limit the scope of the present invention. It must be noted that as used herein, the singular forms "a," "an," and "the" include plural reference unless the context clearly dictates otherwise. The invention described herein is intended to describe one or more preferred embodiments for implementing the invention shown and described in the accompanying figures.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention.

Various embodiments of the present invention are directed to devices that are fluid powered, such as by hydraulics or pneumatics, for example. It is to be understood, however, that some embodiments of the present invention are not limited to this specific technology.

In operating a robot, advanced prosthetic, or some other item or mechanism, some type of power system typically is provided to enable particular movement, such as moving an arm or other appendage. As readily can be discerned, to provide at least up and down movement to an arm member or the like, some type of mechanical or other artificial muscle typically is employed.

In a simple example, a piston driven actuator may be implemented to accomplish this movement. By moving the piston back and forth within a cylinder the piston rod provides the basic movement to the arm member connected at its distal end.

Another type of actuator can be one that mimics the motion of a real biological muscle in the body of a human or other animal. These artificial or mechanical muscles typically provide some type of expandable member or tube connected at one end to an arm member, such as a forearm of a robot, for example, and at the other end to another member, such as the upper arm or shoulder of a robot, for example.

Briefly, in operation, when such a member is expanded in a direction substantially perpendicular to its longitudinal centerline (i.e., radially), it essentially contracts the member, thereby drawing the arm closer to the shoulder. When the member is thereafter allowed to expand in a direction substantially parallel to its longitudinal centerline (i.e., longitudinally), it essentially extends the member and the arm moves away from the shoulder. One example of such a mechanical muscle is known as a McKibbons style actuator.

To improve performance, various embodiments use hydraulic systems to drive their artificial muscles. The overall superior performance of hydraulics for vibration damping, actuation frequency, and volumetric power for compact designs in general applications are well known. In addition, hydraulic systems also provide precise control due to the incompressible nature of their hydraulic fluid. Examples of various hydraulic systems and robotic applications where a mechanical muscle may be employed can be found, for example, in applicant's issued U.S. Pat. No. 7,348,747 filed Mar. 30, 2006, issued U.S. Pat. No. 7,719,222 filed Mar. 24, 2008 and pending U.S. patent application Ser. No. 12/731,270 entitled "Task Flexibility for Actuators" filed Mar. 25, 2010 and related co-pending applications, and U.S. patent application Ser. No. 13/625,200 entitled "Hydraulic Actuator" filed Sep. 24, 2012 all of the disclosures of which are hereby incorporated by reference. It is to be understood, however, that some particular details of the hydraulic system itself, as well as the robot, vehicle, tool, heavy equipment, actuator, or other apparatus, can vary without departing from the teachings of various embodiments of the invention.

Prior art robots typically have a significant portion of their hydraulic circuits exposed to the environment and/or on their external surfaces. As a result, their hydraulic circuits undesirably increase their external sizes, which often inhibits their agility and usefulness. For example, hydraulic circuit components can frequently but inadvertently catch or hook onto other objects in their environment.

Illustrative embodiments respond to these problems by forming much of the hydraulic circuit within the interior of the robot. Specifically, as known by those in the art and noted above, hydraulic circuits often have pressure accumulators to absorb pressure spikes in the line/circuit, and to provide extra power when needed (i.e., acting as a power store). Undesirably, pressure accumulators often are bulky and do not permit flow from end to end. Instead, they often are a terminal point of a hydraulic line. Moreover, as noted above, they are exterior to the robot. Illustrative embodiments change this paradigm by forming in-line pressure accumulators that, in various implementations, are positioned entirely or partly within the robot. For example, the accumulator may be within a robotic limb (e.g., a leg or arm limb).

Figure 2:
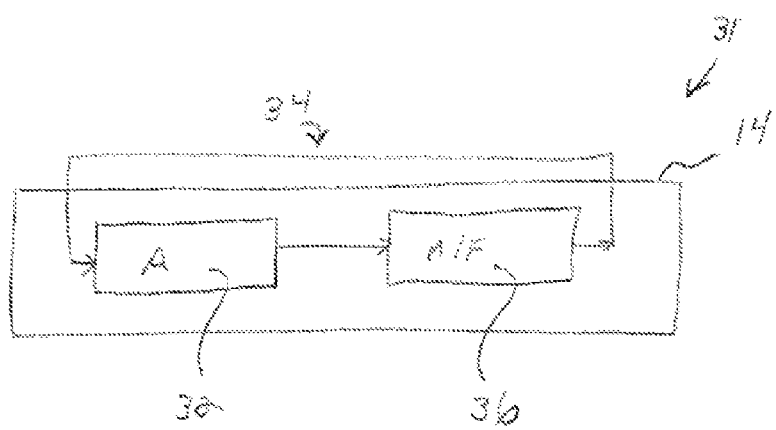
FIG. 2 is a schematic view of a hydraulic circuit with an accumulator configured in accordance with illustrative embodiments of the invention.

To that end, FIG. 1 schematically shows a robot 14 that may be implemented with an interior in-line accumulator 32 shown in FIG. 2. As shown, the robot 14 has a functional body 16 mounted on a mobility platform 20. Among other things, the mobility platform 20 includes a base 18 for mounting the body 16, and a drive structure (not shown in detail) for moving the overall robot 14 in the desired manner around its environment. To that end, the drive structure, among other components, includes a plurality of wheels 22 mounted on an axle/motor structure. The drive structure communicates with a central computing logic or controller (not shown) to control its movement.

Additionally, as noted, the base 18 couples and supports various structures, such as the body 16. Those skilled in the art should recognize that the interchangeable nature of the types of bodies 16 that may couple with the base 18 are limited only by the desired application. In some embodiments, the base 18 also is capable of rotating 360 degrees. For example, the base 18 may rotate 360 degrees relative to the body 16, thus permitting the body 16 to remain in its current orientation. As another example, the base 18 and body 16 may rotate together.

The body 16 may include a wide variety of components depending on the application. For example, the body 16 may a side panel 24 having a plurality of shelves 26 and drawers 28 for transporting various items, and a front display/monitor (not shown) for controlling the robot 14 and communicating with its environment. For example, when used in the hospital context, the drawers 28 can contain medicine, patient charts, and small medical devices (e.g., syringes), while the shelves 26 can contain larger medical items, such as IV lines, fluid bags, and bed pans. Of course, other sides also can have shelves 26 and other storage areas, such as the front (as shown), back or opposite side.

The body 16 has an interior that houses logic controlling the movement and operation of the robot 14. Accordingly, the interior may include internal microprocessors, controllers, and other circuitry conventionally used for such purposes. In illustrative embodiments, visual, sound, inertial, and other sensors also are housed in the robot 14 collect data that enables the robot 14 to determine how and where to maneuver in its environment. Data signals from these sensors, as well as data and control signals relative to positioning, orientation, etc., may be sent to and from a remote source to permit remote operation, or to simply provide environmental awareness. The data may be transmitted to and from the robot 14 using any communication media and technology known to those skilled in the art, via cables or other wired means or via wireless communications signals (e.g., Bluetooth, IR, etc.) across a network (e.g., a computer network, such as the Internet). In either case, transmitters and/or transponders, including Global Positioning System (GPS) units, may be employed.

The robot 14 also may have extension members that extend outwardly to grasp objects. For example, the robot 14 may have an anthropomorphic torso and an articulated arm 30 suited for lifting and carrying various payloads (e.g., medicine bottles). To lift the payloads, the arm 30 also has an activation element/artificial muscle (e.g., a bundle of activation elements as discussed above, not shown in FIG. 1) controlled and coordinated using a hydraulic circuit 31. To absorb pressure spikes and store energy, among other uses, the hydraulic circuit 31 also has an in-line accumulator 32 preferably within the interior of the robotic arm 30, and an exterior hydraulic line 34 for completing the circuit 31. The hydraulic circuit 31 may include additional components, such as those discussed below with regard to FIG. 2. Among others, the robot 14 may be similar to the QCBOT, produced by Vecna Technologies, Inc. of Cambridge, Mass. and variations thereof.

FIG. 2 schematically shows of a hydraulic circuit 31 with a pressure accumulator 32 configured in accordance with illustrative embodiments of the invention. Specifically, the circuit 31 includes the accumulator 32 fluidly connected to a number of other components 36 that may be within a conventional hydraulic circuit. Those other components 36 are collectively shown schematically in the box labeled "M/F," which can include a pump, motor, filter, controller, etc. The circuit 31 preferably recirculates liquid using conventional fluid tubing, such as medical grade or other type of tubing. The accumulator 32 and other components 36 are shown as being within the robot 14 (e.g., within a robotic arm 30 or other limb), which is schematically shown as containing the accumulator 32 and other components 36. At least a portion of the tubing may be exterior to the robot 14. In other embodiments, however, the tubing is substantially entirely interior to the robot 14. As another example, some embodiments may position some of the other components 36 (e.g., the pump) on the exterior of the robot 14.

It also should be noted that the system can have multiple accumulators 32 in a single hydraulic circuit 31. For example, a robotic arm 30 can have two, three, or four serial or parallel accumulators 32 to store energy and moderate pressure spikes.

Figure 3A:
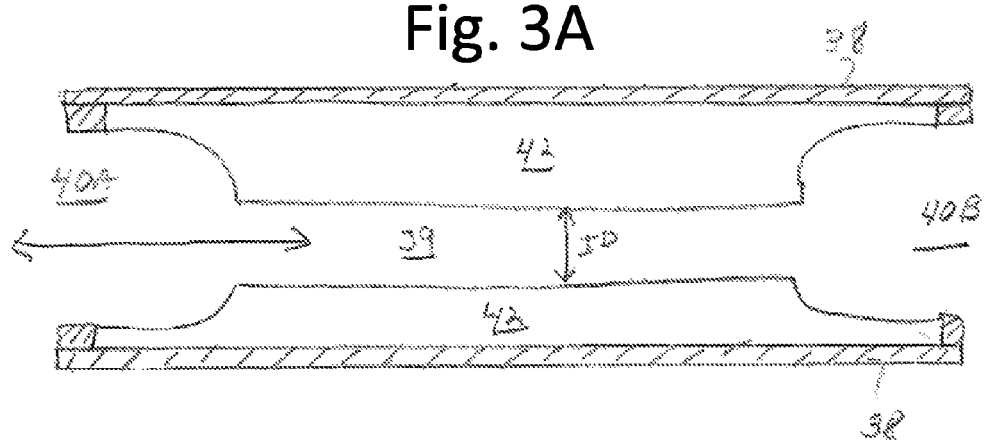
FIGS. 3A-3C schematically show cross-sectional views of the accumulator of FIG. 2 in three states: charging, system pressure, and maximum surge states, respectively.
Figure 3B:
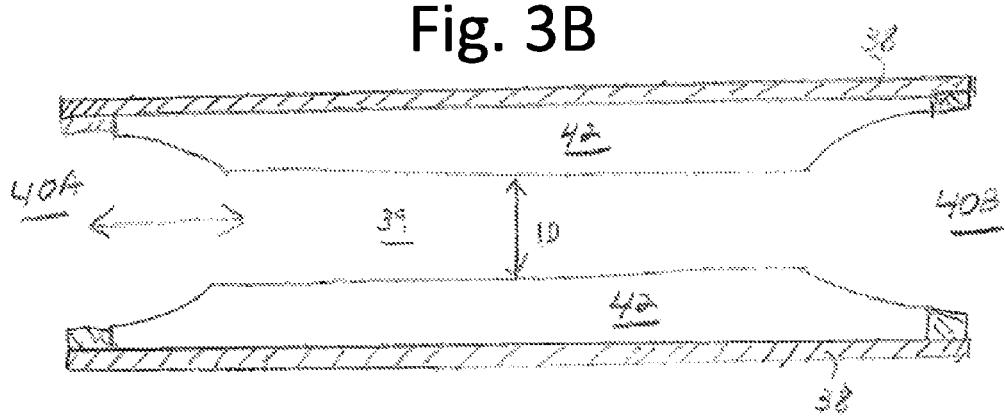
Figure 3C:
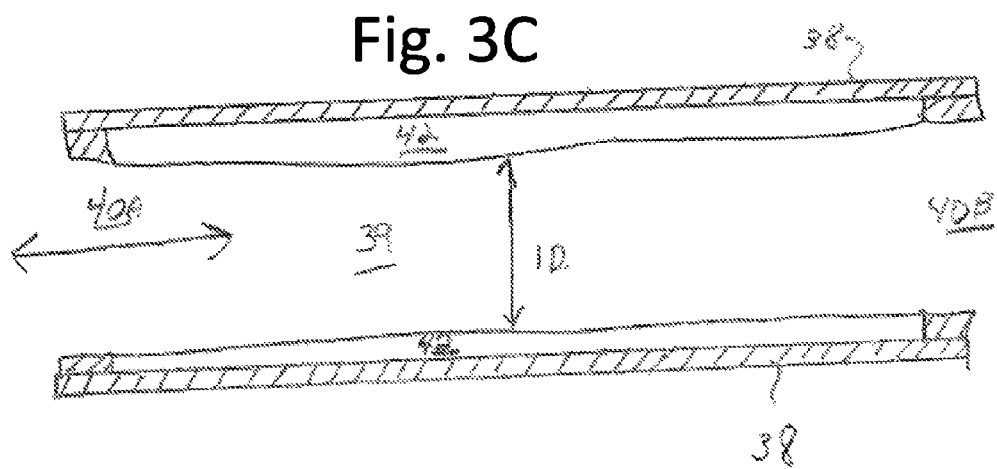

FIGS. 3A-3C schematically show cross-sectional views of the accumulator 32 of FIG. 2 in three respective states: 1) a charging state, 2) a system pressure state, and 3) a maximum surge state. More particularly, as shown, the pressure accumulator has a rigid outer structural member 38 that forms a liquid channel 39 having a first interface 40A and a second interface 40B for receiving and channeling liquid. Liquid can flow between the first and second interfaces 40A and 40B in either direction. The rigid structural member 38 can be formed from any of a number of different materials, depending on its use. For example, the rigid member 38 may include carbon, steel, and/or aluminum. Alternatively, the structural member 38 can be formed at least in part from semi-rigid or flexible materials.

In accordance with illustrative embodiments of the invention, the accumulator 32 also has a compressible member 42 that forms the inner dimension of at least a portion of the liquid channel 39. The compressible member 42 may be generally concentric with the rigid structural member 38, although such a relationship is not necessary. Some embodiments may form the compressible member 42 about the full 360 degrees of the inner surface of the rigid member 38, while other embodiments only form the compressible member 42 about a portion of the 360 degrees of the rigid member inner surface.

At a single static pressure, this inner dimension, which is shown in the figures as "ID," can vary along the length of the channel. For example, the region near the first and second interfaces 40A and 40B may have enlarged inner dimensions with a rounded contour to more efficiently channel fluid into the narrower, more central region of the liquid channel 39. This varying inner dimension can be random or carefully preconfigured into the material of the compressible member 42. For example, the inner dimension may vary along the region near the center of the accumulator 32, and/or near the interfaces 40A and 40B. In contrast, the channel may maintain a generally constant inner dimension at the same or different pressures. In other embodiments, the inner dimension is generally constant when subjected to one pressure, and variable when subjected to another pressure. Also for a single pressure, the compressible member 42 may both compress and decompress at different regions. When subjected to a changing pressure, the compressible member 42 may have similar properties.

The compressible member 42 can be formed from any of a number of different components. For example, the compressible member 42 may include a rubber balloon or elastomeric diaphragm or bladder containing a compressible gas (e.g., nitrogen). Other compressible members 42 may include a solid, compressible material, such as a sponge rubber, a piston with a spring (e.g., a coil spring, leaf spring, or material spring), or other known compressible members in the art. In fact, the compressible member 42 effectively may be formed by a plurality of separate but cooperating compressible members 42. For example, a plurality of separate compressible members 42 may line up serially along the length of the liquid channel 39. To provide more design flexibility, the compressible member 42 may be formed from a plurality of nested, radially spaced compressible members 42. Some or all of the multiple compressible members 42 can compress at different rates, thus providing variable force.

When connected to the hydraulic circuit 31, the accumulator 32 acts to both smooth out pressure spikes, and provide extra force when needed among other uses some of which are known in the art. FIG. 3A thus shows one schematic view of the accumulator 32 when not subjected to any pressure—i.e., when the system has substantially zero pressure or is at system pressure, for example. As shown, the inner dimension of the majority of the channel is smallest when in this state. FIG. 3B schematically shows the accumulator 32 when subjected to a moderate anticipated pressure, such as the normal or higher system pressure range. In this view, the inner dimension is larger than in the no-pressure state of FIG. 3A. In other words, the compressible member 42 is further compressed to radially increase the inner dimension of the liquid channel 39. Also of note is the rounded portion of the compressible member/liquid channel near the interfaces 40A and 40B. Specifically, this rounded portion may be somewhat less rounded when subjected to ambient, system pressures.

FIG. 3C schematically shows the accumulator 32 when subjected to a high system pressure. In this state, the compressible member 42 is compressed toward its maximum inner dimension. This maximum inner dimension may be generally constant, as shown, or vary. In either case, the accumulator 32 now has stored pressure that can be released when needed to deliver high force/power. For example, if the robot 14 needs extra force to lift a heavy object, the accumulator 32 may release its compressible member 42, causing it to decompress, forcing the stored pressure out of one or both of the interfaces 40A and 40B. The interfaces 40A and 40B may have a valve at one or both of the interfaces 40A and 40B to provide a more directed pressure application. After decompressing a prescribed amount, the accumulator 32 now can more effectively absorb pressure spikes and again store energy for subsequent use. Systems having multiple accumulators 32 can substantially simultaneously deliver the extra power while absorbing pressure spikes.

The accumulator 32 may be designed to comply with the pressure and force needs of a wide variety of different systems. For example, in the robotic context, one accumulator 32 may be made to handle a first range of pressure spikes and force needs for the robotic arms 30, while a second accumulator 32 may be made to handle a second, higher range of pressure spikes and force needs for robotic legs. Those skilled in the art thus can produce sets of accumulators 32 that each are tuned/configured for different applications.

Figure 4:
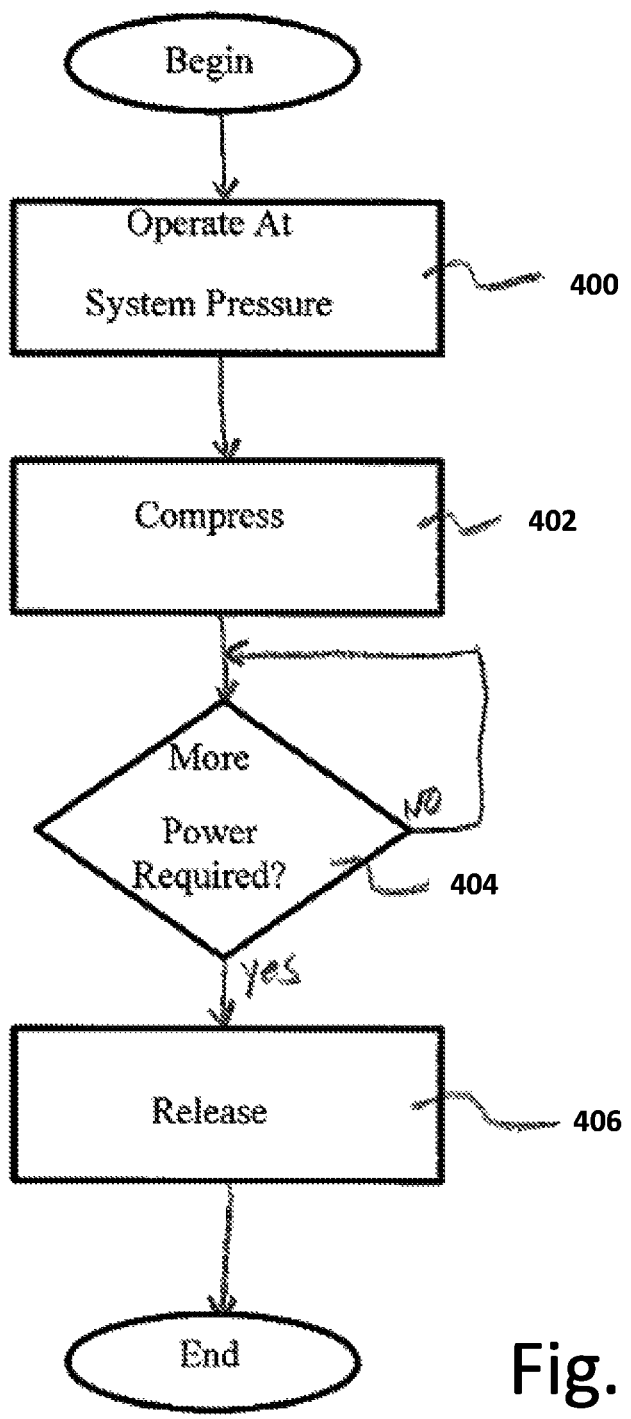
FIG. 4 shows one process of using the accumulator of FIGS. 3A-3C in accordance with illustrative embodiments of the invention.

FIG. 4 shows a process of using the accumulator 32 of FIGS. 3A-3C in accordance with illustrative embodiments of the invention. This process is a simplified version of what could be a much longer process. Accordingly, the process may entail additional steps that are not discussed in FIG. 2. Moreover, some embodiments may perform various steps in a different order than that described. Those skilled in the art should be able to make appropriate changes to the order and number of steps in the process, and still meet the spirit of various embodiments.

The process begins at step 400, in which the hydraulic circuit 31 is operated at normal system pressure (e.g., see FIG. 3B). This pressure should be in a range prescribed for use with the underlying system, such as a robotic system. As such, the system pressure compresses the compressible member 42 to some extent and absorbs pressure spikes/surges in the system. The process continues to step 402, in which liquid pressure within the circuit 31 compresses the compressible member 42 toward its maximum compression (e.g., see FIG. 3C).

Next, at step 404, the process determines whether more power is required somewhere in the system. For example, an internal robotic controller may determine that a robotic arm 30 needs a short burst of additional power to lift a heavy object. In that case, the controller may forward a mechanical and/or electrical signal to the accumulator 32, which releases its compressible member 42, causing additional power to surge into the system (step 406). Thus, the stored power is available on demand. This additional released power, which can be generated from a pressure or plurality of pressures that are different than the ambient system pressure range and maximum received pressure (e.g., pressure spikes), is directly related to the amount of compression of the compressible member 42. It also is contemplated that one or more additional and/or redundant fluid paths or lines may be provided to effectively enable use of this stored power.

Accordingly, illustrative embodiments form an in-line pressure accumulator 32 that can be formed largely within a structural member of an underling device, such as the robot 14. This favorably reduces overall device profile, which is important in many applications, such as mobile applications (e.g., robotics). In addition, illustrative embodiments also reduce overall device weight by permitting the combination of a structural member (e.g., a robotic arm 30) and the accumulator 32.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention. The scope of the present invention is defined by the claims, which includes known equivalents and unforeseeable equivalents at the time of filing of this application.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

What is claimed is:

1. An in-line hydraulic accumulator system comprising:
   a substantially rigid, hollow, elongated cylindrical member forming the exterior of a longitudinal hydraulic fluid channel; and
   a hollow, elongated cylindrical compressible member longitudinally extending within the interior of the rigid member substantially along the entire length of the rigid member forming the interior of the hydraulic fluid channel, the compressible member being configured with an inside diameter and an outside diameter forming an outer periphery and to at least radially compress along its length in response to an increase in fluid pressure within the compressible member, the rigid member restricting any radial outward expansion of the entire outer periphery of the compressible member so that the inside diameter of the compressible member becomes larger upon an increase in fluid pressure to thereby accommodate more fluid therein while the outside diameter about the entire circumference of the compressible member remains constant due to the restriction of the rigid member.

2. The hydraulic accumulator system as defined in claim 1, including tubing connected to opposite ends of the rigid cylindrical member thereby forming a hydraulic fluid circuit, the accumulator being latent from the exterior of the circuit.

3. The hydraulic accumulator system as defined in claim 1, wherein the rigid cylindrical member forms a limb of a robot.

4. The hydraulic accumulator system as defined in claim 1, wherein the cylindrical compressible member comprises a plurality of concentric cylindrical compressible members each having a different compressibility.

* * * * *